(12) United States Patent
Unal et al.

(10) Patent No.: US 7,620,226 B2
(45) Date of Patent: Nov. 17, 2009

(54) SEMI-LOCAL ACTIVE CONTOUR FOR A FAINT REGION DETECTION IN KNEE CT IMAGES

(75) Inventors: Gozde Unal, West Windsor, NJ (US); Gregory G. Slabaugh, Princeton, NJ (US); Hong Shen, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 688 days.

(21) Appl. No.: 11/258,422

(22) Filed: Oct. 25, 2005

(65) Prior Publication Data

US 2006/0093197 A1    May 4, 2006

Related U.S. Application Data

(60) Provisional application No. 60/622,970, filed on Oct. 28, 2004.

(51) Int. Cl.
  *G06K 9/00* (2006.01)
(52) U.S. Cl. ........................................ 382/128
(58) Field of Classification Search ......... 382/128–134; 128/922–932; 250/455–470; 600/407–480
  See application file for complete search history.

(56) References Cited

U.S. PATENT DOCUMENTS

2005/0041842 A1 * 2/2005 Frakes et al. ............... 382/128

OTHER PUBLICATIONS

Yan Kang, Klaus Engelke, and Willi A. Kalender, "A New Accurate and Precise 3-D Segmentation Method for Skeletal Structures in Volumetric CT Data", May 2003, IEEE Transactions on Medical Imaging, vol. 22, No. 5, pp. 586-598.*
Walter A. Carpenter, Richard G. Stiles, and Scott K. Sheppard, "Color Map of Contrast Enhancement on MR Images: Use of Desktop Computers", Jan. 1994, American Roentgen Ray Society: 162, pp. 223-226.*
Tony Chan, et al. "An Active Contour Model Without Edges" *Scale-Space '99., LNCS 1682*, pp. 141-151, 1999.
Satyanad Kichenassamy, et al. "Gradient Flows and Geometric Active Contour Models" *Proceedings of the Fifth International Conference on Computer Vision (ICCV '95)*, 1995, pp. 810-815.
Gozde Unal, et al. "Rigid and Nonridgid Registration of 3D Shapes" Aug. 3, 2005, pp. 1-3.
Nikos Paragios, et al. "Non-Rigid Registration Using Distance Functions" Apr. 2001-Oct. 2001, pp. 1-26.

* cited by examiner

*Primary Examiner*—Samir A. Ahmed
*Assistant Examiner*—Atiba O Fitzpatrick
(74) *Attorney, Agent, or Firm*—Donald B. Paschburg; F. Chau & Associates, LLC

(57) ABSTRACT

An exemplary method of detecting a structure in a three-dimensional (3D) computed tomography ("CT") knee image is provided. An intensity prior mask is created based on a two-dimensional (2D) slice of the CT image. A seed point in the 2D slice is received or estimated. The seed point is in a Hoffa's pad region. A geometric prior mask is created based on the seed point. The intensity prior mask and the geometric mask are combined to form a region mask. A level-set contour is segmented from the 2D slice. The step of segmenting is constrained by the region mask.

13 Claims, 9 Drawing Sheets

Slice 33

Slice 25

Slice 33

Slice 25

Slice 33

Slice 25

SEMI-LOCAL ACTIVE CONTOUR FOR A FAINT REGION DETECTION IN KNEE CT IMAGES

CROSS-REFERENCE TO RELATED APPLICATIONS

This application claims priority to U.S. Provisional Application No. 60/622,970, which was filed on Oct. 28, 2004, and which is fully incorporated herein by reference.

BACKGROUND OF THE INVENTION

1. Field of the Invention

The present invention relates generally to the field of medical imaging, and, more particularly, to a semi-local active contour for a faint region detection in knee computed tomography ("CT") images.

2. Description of the Related Art

Detection of specific anatomic structures in medical images is an important research problem in Computer Aided Diagnosis ("CAD") applications. Consider, for example, the segmentation problem shown in FIG. 1. Two regions of interest, which refer to infrapatellar fat of the knee joint (also known as Hoffa's pad), are labeled roughly by ellipses. The two images shown in FIG. 1 are two slices from a knee computed tomography ("CT") sequence. Slices 25 and 33 are shown from an axial knee CT sequence of 53 slices. Referring to FIG. 2, the two regions of interest of FIG. 1 are refined by a clinician by hand to show the actual boundaries of the Hoffa's pad, according to that clinician. FIG. 2 may be used, for example, to validate automated methods of segmenting and/or analyzing anatomical structures in medical images.

It is generally desirable for a clinician to understand the physiomechanical properties of the knee fat during flexion and extension of the knee. By outlining the target area, the clinician can obtain the shape or surface of the knee fat, and the bending/extending characteristics of the knee fat can be analyzed. The clinician can also facilitate a quantitative measurement for the amount of shape change in extended knee fat and flexed knee fat. The understanding of knee function and pathology may be increased by the study of shape and deformation from the extracted Hoffa's pad in flexed and extended knee medical images.

SUMMARY OF THE INVENTION

In one aspect of the present invention, a method of detecting a structure in a three-dimensional (3D) computed tomography ("CT") knee image is provided. The method includes the steps of (a) creating an intensity prior mask based on a two-dimensional (2D) slice of the CT image; (b) receiving a seed point in the 2D slice either from the user, or automatically estimating the seed, the seed point being in a Hoffa's pad region; (c) creating a geometric prior mask based on the seed point; (d) combining the intensity prior mask and the geometric mask to form a region mask; and (e) segmenting a level-set contour from the 2D slice, wherein the step of segmenting is constrained by the region mask.

In another aspect of the present invention, a machine-readable medium having instructions stored thereon for execution by a processor to perform a method of detecting a structure in a three-dimensional (3D) computed tomography ("CT") knee image is provided. The method comprising: The method includes the steps of (a) creating an intensity prior mask based on a two-dimensional (2D) slice of the CT image; (b) receiving a seed point in the 2D slice either from the user, or automatically estimating the seed, the seed point being in the Hoffa's pad region; (c) creating a geometric prior mask based on the seed point; (d) combining the intensity prior mask and the geometric prior mask to form a region mask; and (e) segmenting a level-set contour from the 2D slice, wherein the step of segmenting is constrained by the region mask.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
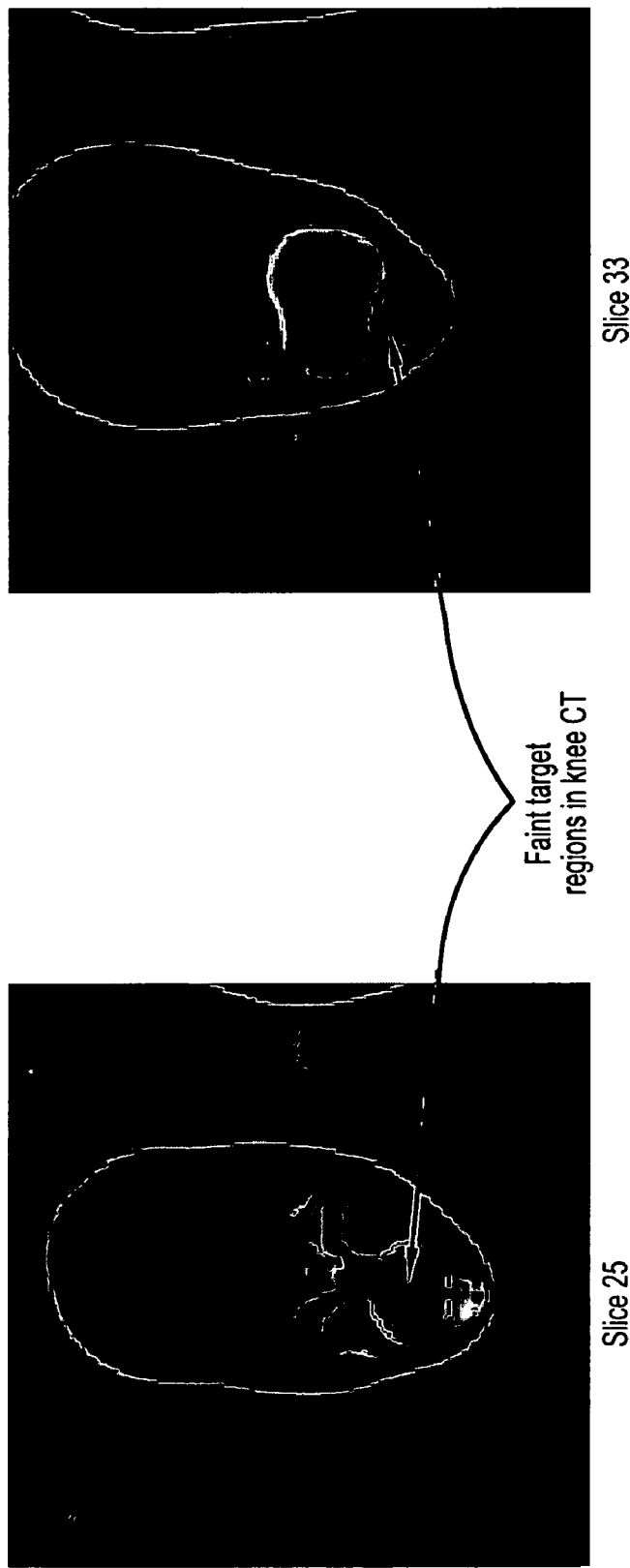
FIG. 1 depicts two slices from a knee CT sequence.
Figure 2:
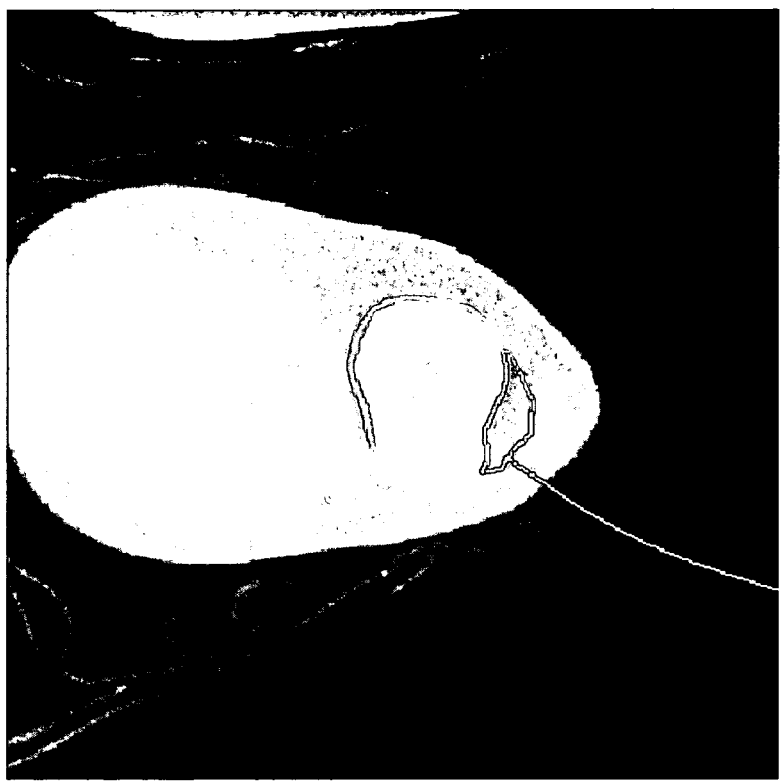
FIG. 2 depicts the two slices of FIG. 1 with a hand-drawn validation contours by a clinician.
Figure 2:
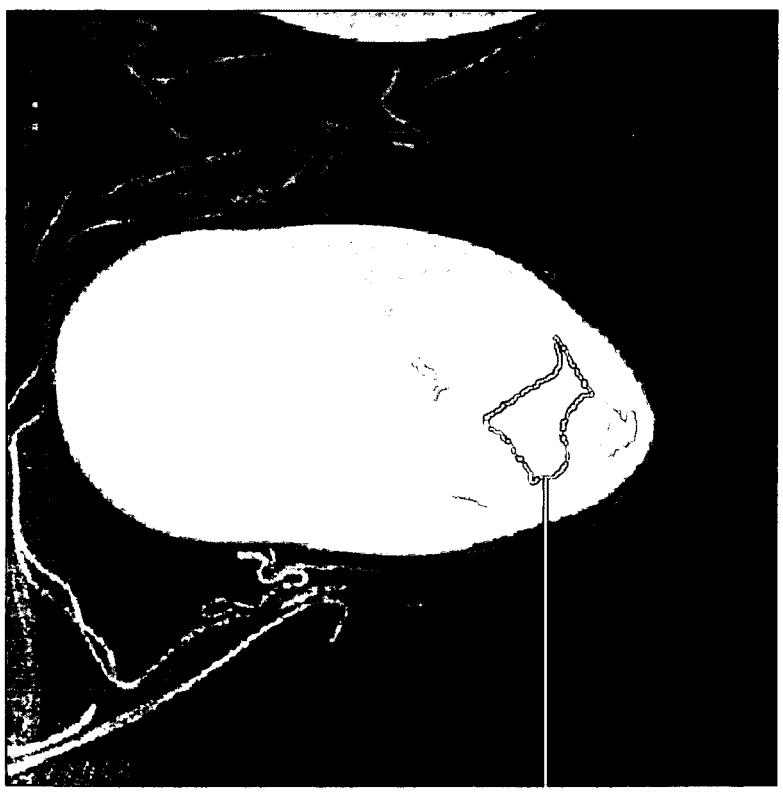

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We present a novel method for detecting a specific target structure which appears as a very faint region in knee computed tomography ("CT") images. We utilize an active contour with spatial and intensity priors. Although not so limited, the detected target structure is presented in two-dimensional ("2D") images. The detected target structure may also be presented in three-dimensional ("3D") images, as contemplated by those skilled in the art. For example, 2D contours estimated from each slice of a 3D CT volume can be stacked to form a 3D surface.

The general purpose of image segmentation is to partition an image into non-overlapping regions based on certain attributes, such as intensity and texture. One common method of image segmentation is the general active contour method. In the general active contour method, the boundary of an object, which exhibits a certain region character inside the boundary, and usually has a large image gradient value on the boundary, is detected by an evolving curve. We utilize a general active contour method using level sets for segmenting knee fat (i.e., Hoffa's pad) in knee CT images. In active contour propagation, the speed of the contour is what drives the contour towards the solution. For instance, a constant speed would just shrink or expand the contour. Then for segmentation purpose, a varying speed that depends on the image descriptors is utilized in the active contours framework. Usually, update equations are derived to propagate the contour and those equations can include several speed terms.

Two straightforward techniques for image description in active contours include edge-based description and region-based description. The edge-based speed terms in an active contour update equation depend on the high image gradients on the object boundary, and are designed to slow down the propagation of the contour where there are high image gradients. The edge-based (i.e., geometric) active contour model is described in S. Kichenassamy, P. Olver, A. Kumar, A. Tannenbaum and A. Yezzi, "Gradient Flows and Geometric Active Contour Models," in Int. Conf. Computer Vision, 1995, pp. 810-815, the disclosure of which is fully incorporated by reference. The region-based techniques depend on a region descriptor inside and outside the object boundary. The simplest active contour based on region-based descriptors makes a homogeneous region assumption inside and outside the contour, and uses a region-based speed term that compares image intensities with a piece-wise constant intensity model where the constant intensities inside and outside the contour are maximally separated. The original region-based active contour method using level sets method is described in the paper by T. F. Chan and L. A. Vese, "An active contour model without edges," in *Int. Conf. Scale-Space Theories in Computer Vision,* 1999, pp. 141-151, the disclosure of which is fully incorporated by reference.

Although we utilize a general active contour method using level sets, without any constraints or priors on the problem, such methods will inevitably fail due to presence of many local extrema in the knee CT images. Due to weak image gradients at the boundary of the Hoffa's pad, the edge-based model will not be useful. Also due to a weak transitioning between the intensities of the homogeneous regions inside and outside the Hoffa's pad, a general region-based model will not be useful as well.

We propose to exploit two different prior information on the problem. We utilize two different constraints: an intensity constraint and a spatial constraint, in solving the problem.

Intensity Analysis

We utilize a region-based active contour model because there are not enough strong gradients in knee CT image data to make use of an edge-based active contour model. However, even with a region-based active contour model, we want to limit the amount of information the contour uses by running a prior analysis on the intensity distribution of the image. This is based on our novel observation that the knee CT images we obtained have basically a four-modal distribution. We verified this observation by computing the histograms of the 2D CT slices.

Figure 3:
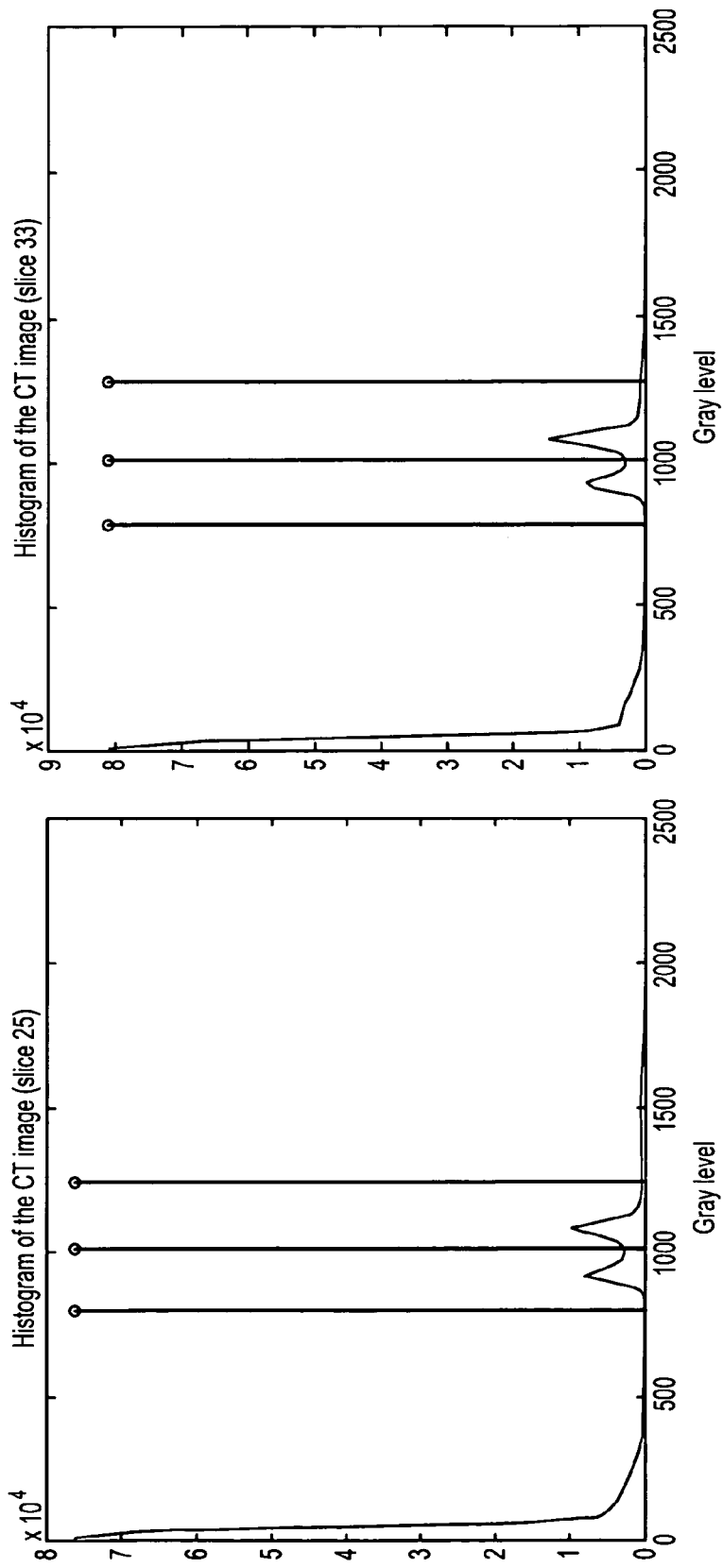
FIG. 3 depicts histograms of the two slices of FIG. 1 partitioned into four regions, in accordance with an exemplary embodiment of the present invention.
Figure 4:
FIG. 4 depicts the two slices of FIG. 1 partitioned into four regions using intensity limits detected in the histograms of FIG. 3, in accordance with an exemplary embodiment of the present invention.
Figure 4:
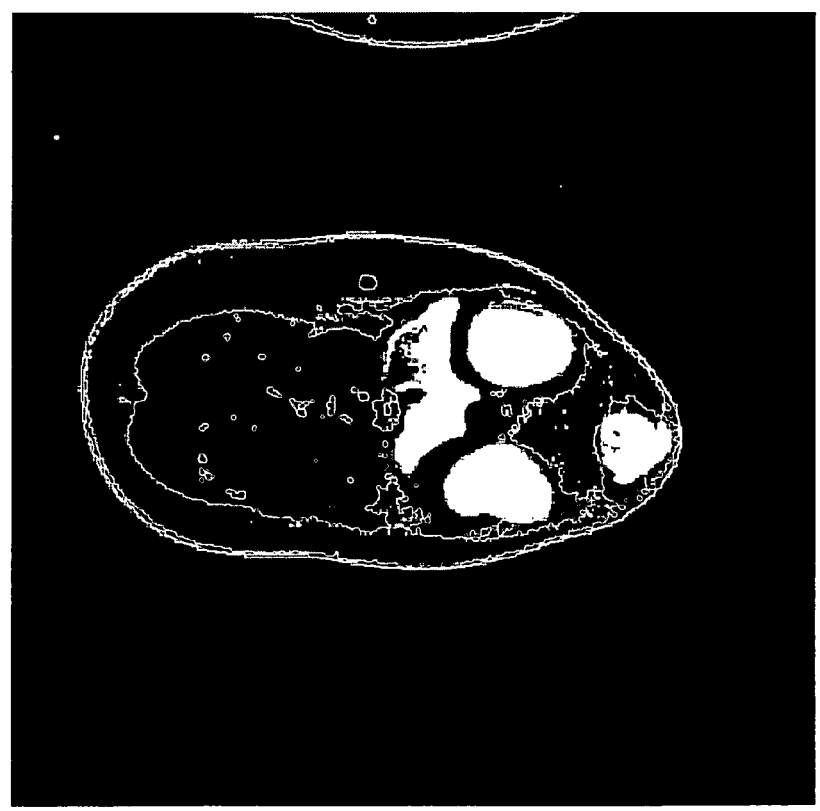

In FIG. 3, we show the intensity histograms of slices 25 and 33 from a typical knee CT sequence. Also shown are the detected peaks that partition the histogram into four distinct regions. In FIG. 4, these partitioned regions correspond to "black" 405 (region=0), "dark gray" matter 410, i.e., fat (region=1) 410, "light gray" matter 415, i.e., muscle and tissue (region=2), and "white" matter 420, i.e., bones (region=3) regions in these CT image.

The region-based active contours propagate by monitoring statistics inside and outside the contour. To simplify the problem, and to alleviate the burden of local minima, we form a mask based on the above partitioning of the image intensity space. The active contour completely ignores the space of black intensities. In addition, instead of a global statistics approach, the active contour looks at a band around itself with a specified radius, thereby using semi-local image statistics.

Spatial Prior

Figure 5:
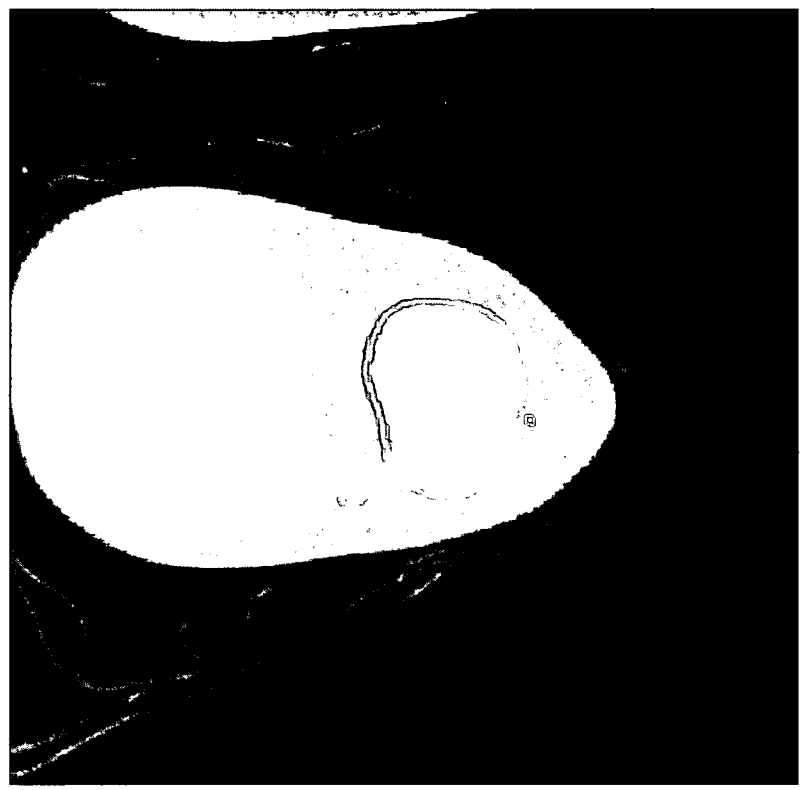
FIG. 5 depicts the two slices of FIG. 1 after initializing a seed for each slice, in accordance with an exemplary embodiment of the present invention.
Figure 5:
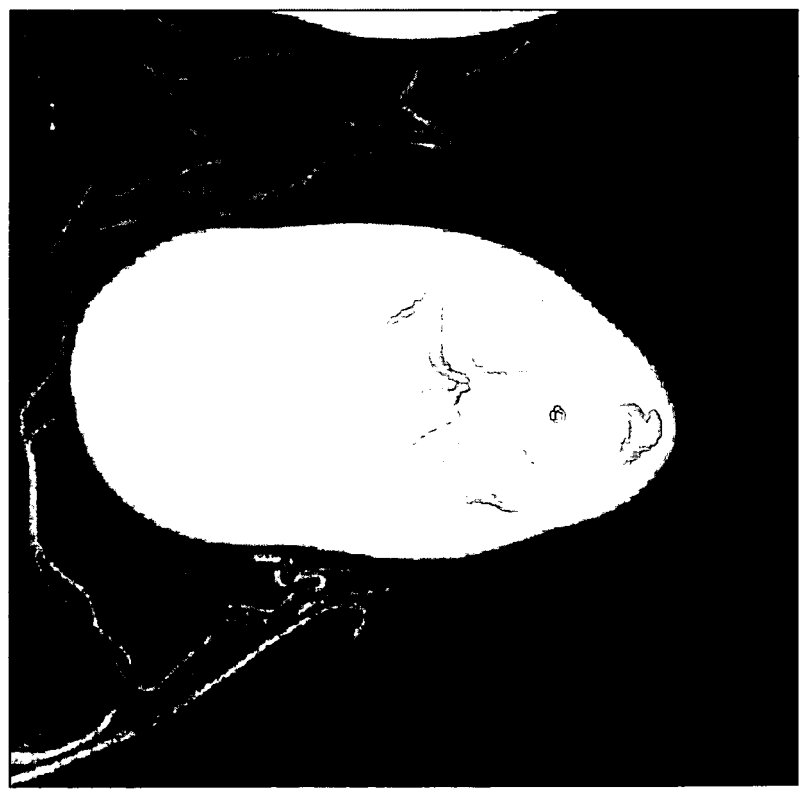

To start the segmentation, a seed 505 on a CT slice image is obtained either by a user input or automatically as shown in FIG. 5. If a user input is not available for the initial seed point, an automatic seeding is facilitated as follows. Knee CT data scans exhibit an appearance in which the soft tissue, muscles and the knee bones have a general spatial arrangement. The Hoffa's pad is located in the space between the knee bones (the white intensity partition) towards the anterior of the patient anatomy. Utilizing our intensity prior mask, the bone regions (region=3) are already detected from the image. Similarly, the non-black foreground region of the image (pixels with region value>0) is also already outlined, which includes all those pixel locations excluding the black intensity pixels in our intensity prior mask. The relative location of the centroid of the bone region with respect to the centroid of the non-black foreground region provides the major axis direction of the anterior of the patient, along which the Hoffa's pad is also located. Once the major axis direction along the posterior-to-anterior of the knee is obtained, the seed is searched along that axis from posterior to anterior, i.e. from the knee bone regions towards the anterior end. The Hoffa's pad region is composed of fat tissue, hence its intensity in CT images generally falls in the dark-gray partition of the intensity prior mask we created. To constrain the search space, we create a new set of dark-gray intensity cluster with all those points whose location resides in the anterior side of the bone region centroid. We add this information to the intensity prior mask by setting those point locations to "region=5". We refer to this region as the "constrained dark-gray intensity" region. Therefore, an automatic seed is estimated by going along the major axis direction towards the anterior and finding the point on that axis, whose intensity value falls in the dark-gray intensity partition, and is also closest to the centroid of the "constrained dark-gray intensity" region (region=5).

The seed leads to a very natural spatial prior on the problem because the knee fat region is expected to cover only some limited part of the image. The added seed triggers a contour initialization with a small radius. The centroid of the added seed or the contour acts as a center for a constraining circular or elliptical mask, which in turn acts as a spatial prior on the problem. The diameter of the circular mask is limited as follows. From the seed coordinates, we extend lines towards the boundaries of the black background region, and mark the points where the black regions are first encountered. The half of this length (i.e. the length between the two marked points) would be a largest radius r of the circle. We choose a parameter e to find a reasonably sized circle radius r-e.

Such a spatial prior is essential because the knee fat region has very similar intensity properties as that of the dark gray matter that appears near the boundaries of the non-black parts of the CT image. This can be observed in the already partitioned images via histogram analysis in FIG. 4.

Figure 6:
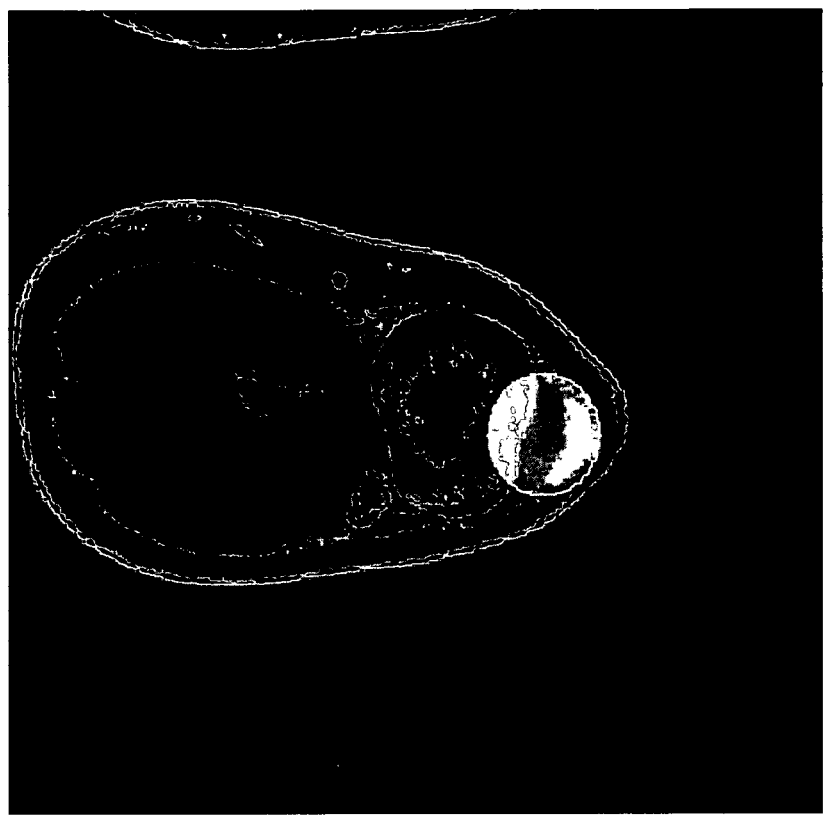
FIG. 6 depicts the two slices of FIG. 5 after obtaining masks around the seed, in accordance with an exemplary embodiment of the present invention.
Figure 6:
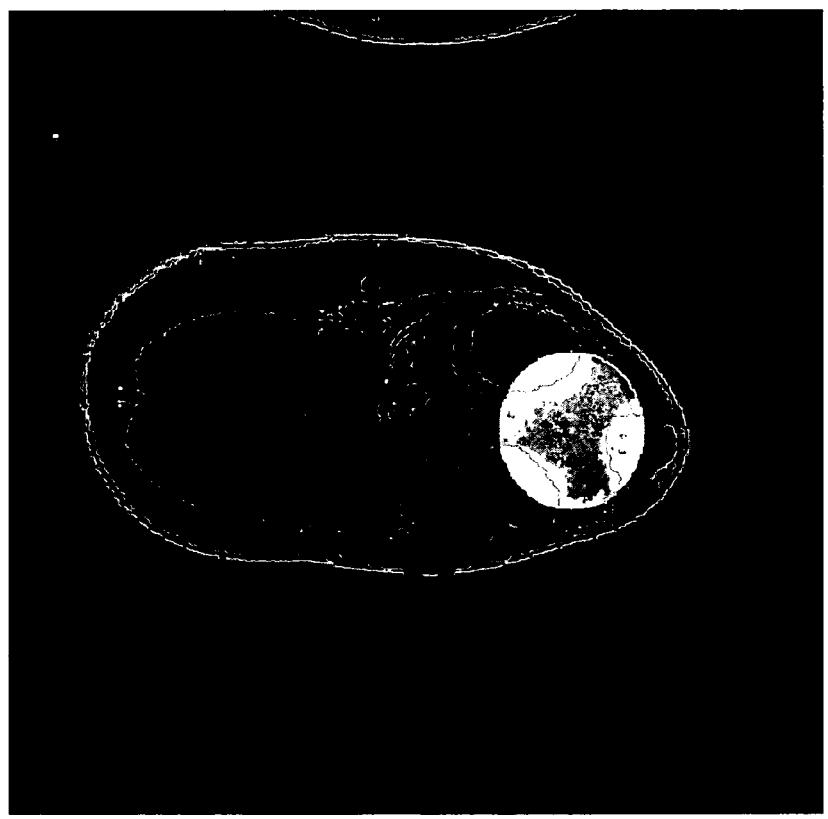

In FIG. 6, our estimated mask 605 is shown as a white circular region, and the active contour will be allowed to propagate only on this final circular region. The usage of this mask in our active contour evolution prevents the leakage problems as would be inevitable to avoid otherwise. We term this resulting active contour methodology as "semi-local," because the image information we make use of is not global but also not entirely local.

Figure 7:
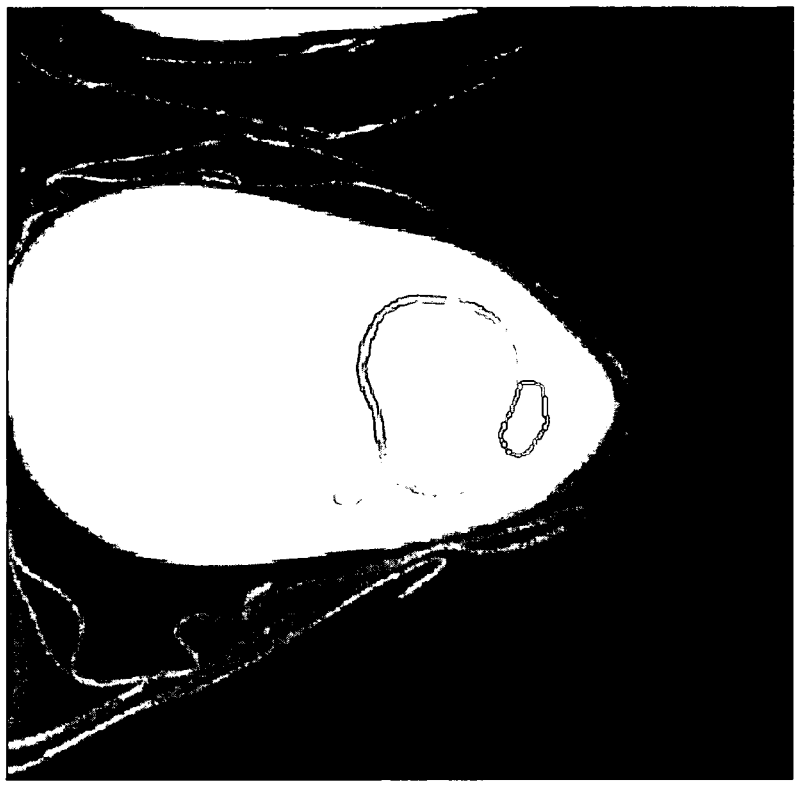
FIG. 7 depicts the two slices of FIG. 6 in an intermediate step of propagating the active contour, in accordance with an exemplary embodiment of the present invention.
Figure 7:
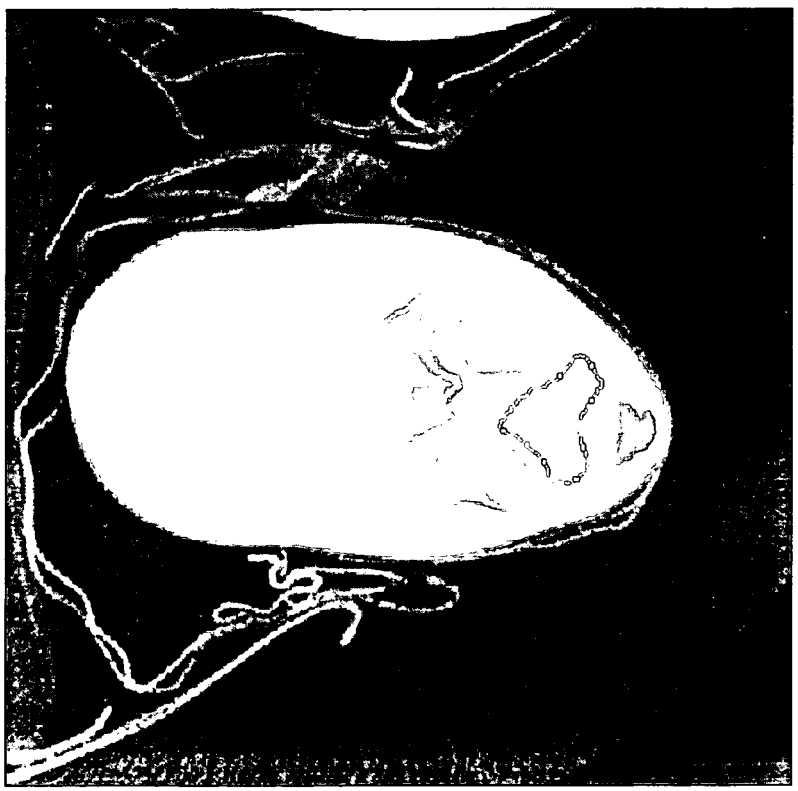

In FIG. 7, we show an intermediate step in propagation of the active contour 705. As the active contour 705 approaches the mask boundaries, the active contour will come to a stop and will not propagate any more.

Exemplary Results

Figure 8:
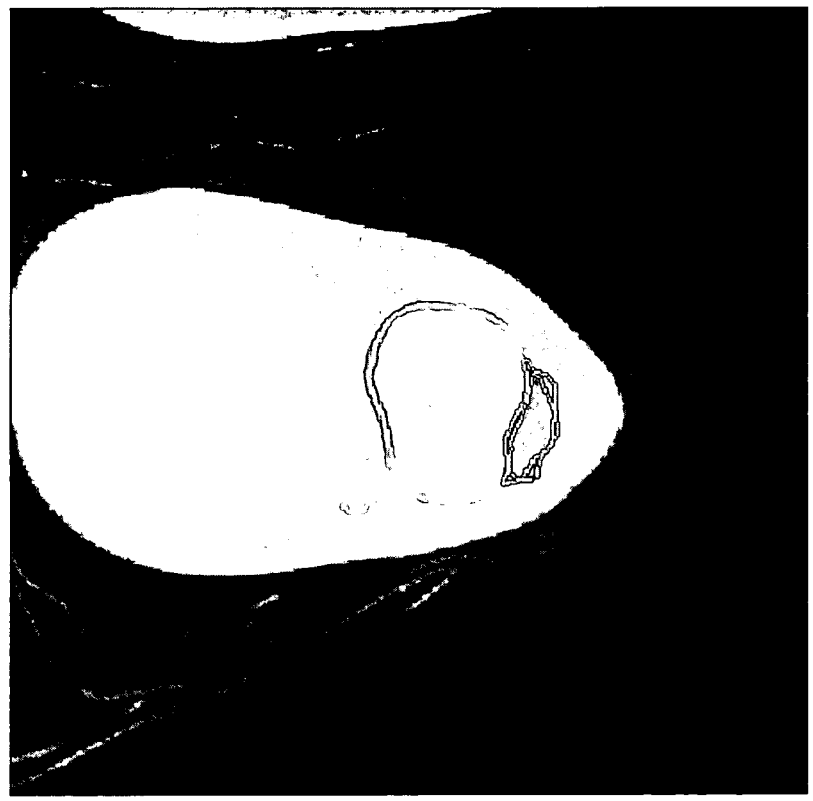
FIG. 8 depicts the two slices of FIG. 7 after propagating the active contour along with the clinician's segmentation, in accordance with an exemplary embodiment of the present invention.
Figure 8:

We show typical results of the active contour segmentation in convergence in FIG. 8 in comparison with the manually segmented validation data provided by clinicians. The active contour 805 is shown in black color whereas the clinician's hand-drawn contour 810 is shown in white.

It can be observed that although the active contour reasonably segments the target knee fat region depending on semi-local intensity characteristics, the results are not in perfect agreement with the manual outlining results obtained by the clinicians. It should be noted, however, that clinicians themselves are still getting trained at recognizing and visually outlining such regions, and their hand-drawn contours may not be the absolute validation truth. This fact led us to conclude that it may be feasible to use the segmentation approach described herein to speed up the processing of 3D volumes and to help clinicians to more efficiently and robustly outline and later analyze the shape characteristics of the Hoffa's pad. Our automatic segmentation of the Hoffa's pad also facilitates a deformation analysis through an estimation of a non-rigid deformation field between the Hoffa's pad surface in the flexed volume and the Hoffa's pad surface the extended volume.

Figure 9:
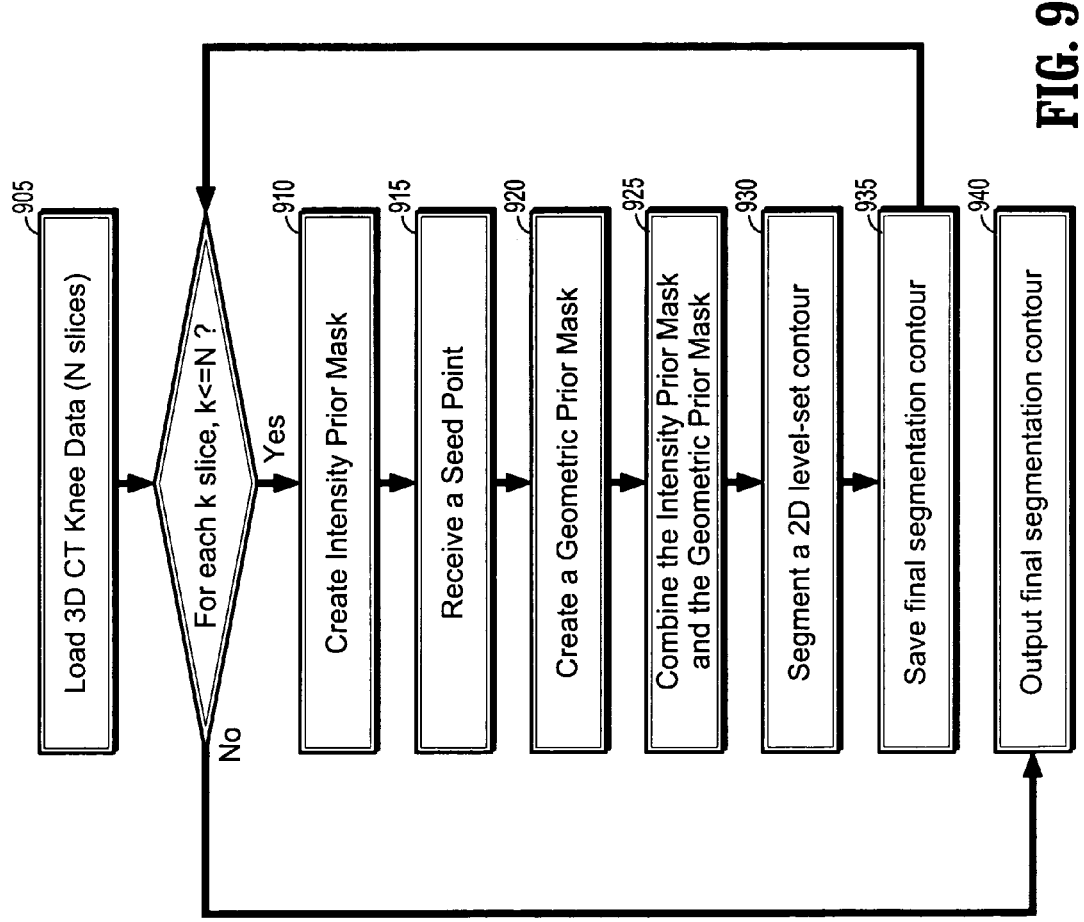
FIG. 9 depicts a flow diagram illustrating an exemplary embodiment of the present invention.

Referring now to FIG. 9, a flow diagram illustrating an exemplary embodiment of the present invention is shown. After loading (at 905) 3D CT knee data with N 2D slices, the following five steps are performed for each of the N slices. The 3D CT knee data includes both scans during extension and scans during flexion. In a first step, an intensity prior mask is created (at 910). In one embodiment, a probability distribution of the intensity in the given slice is estimated. For example, a histogram is computed. Extrema of the histogram are detected, pruned, and partitioned into four intensity labels. To create the intensity prior mask, four regions are created with the four intensity labels: (a) region=0 for black background; (b) region=1 for dark gray matter (fat); (c) region=2 for light gray matter (muscle and tissue); and (d) region=3 for white matter (bones).

In a second step, a seed point is received (at 915). The seed point may be automatically determined, or received from user input. If the seed is not input by the user, an estimate of the seed location for a full-automatic seeding is computed. First the major axis direction along the axial knee CT image running from the posterior towards the anterior is found by taking the difference between the position vector of the centroid of the bone region (region=3) and the position vector of the centroid of the non-black foreground region (region>0). Then the constrained dark-gray intensity region (region=5) is formed using this direction as a guideline, and includes locations of those dark-gray intensity pixels which reside in the anterior side of the anatomy with respect to the bone region centroid. Finally, the seed is found as the point on the major axis, whose intensity is in the dark-gray intensity partition, and is also closest to the centroid of the constrained dark-gray region (region=5). After the seed is received, a contour with a small radius is initialized around the seed point.

In a third step, a geometric prior mask is created (at 920). We estimated a circular geometric mask (i.e., geometric prior mask) as follows. Pixels from the seed point out towards background boundary are raster scanned. Two points are detected where the scan hits the background, utilizing the region mask previously computed. The diameter of the circular geometric mask is calculated from the width of the detected segment between the two points. The circular geometric mask is incorporated (at 925) to the intensity prior mask as (e) region=4 for geometric constraint. The resulting combination of the circular geometric mask and the intensity prior mask is a region mask.

In a fourth step, a 2D level-set contour is segmented (at 930) constrained by the region mask. Segmentation may be performed in any of a variety of ways, as contemplated by those skilled in the art, utilizing the region mask created in steps 910 to 920. In one embodiment, assuming a piecewise-constant region model for the Hoffa's pad region, a level set contour is propagated. The level set contour is constrained with the region mask. The propagation continues until convergence.

In a fifth step, the final segmentation contour (i.e., the result of step 935) is saved for the given 2D slice. In alternate embodiment, binary region labels (i.e., 1 for Hoffa's pad, 0 otherwise) are saved for the given CT slice.

As previously mentioned, steps 910 and 930 are repeated for each of the N slices of given CT knee data in the flexion volume, and CT knee data in the extension volume. For both the flexed knee CT scan and the extended knee CT scan, the result may be output (at 940) as a stack of 2D contours or a 3D surface. For example, either the signed distance function representation of the segmentation all over the CT knee data or the surface which is the zero-level set of the signed distance function can be output as the final segmentation. A triangulation of the final surface can also be performed to output a 3D polygonal mesh for the Hoffa's pad. Any of these outputs will be used for further analysis and measurements in physiomechanical properties of the Hoffa's pad during extension and flexion of the knee. One exemplary analysis to be carried out is the calculation of the amount of deformation in the Hoffa's pad from knee flexion to knee extension. Deformation analysis of the Hoffa's pad in the flexed knee volume and the extended knee volume can be carried out by estimating a non-rigid displacement field between the two Hoffa's pad surfaces extracted from these volumes. The amount of deformation of the Hoffa's pad from flexion to extension can be calculated using the displacement field.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of detecting a structure in a three-dimensional (3D) computed tomography ("CT") knee image in a computer aided diagnosis device, the method comprising:
   (a) creating an intensity prior mask based on a two-dimensional (2D) slice of the CT image by the computer aided diagnosis device;
   (b) receiving or estimating a seed point in the 2D slice, the seed point being in a Hoffa's pad region by the computer aided diagnosis device;
   (c) creating a geometric prior mask based on the seed point by the computer aided diagnosis device;
   (d) combining the intensity prior mask and the geometric prior mask to form a region mask by the computer aided diagnosis device; and
   (e) segmenting a level-set contour from the 2D slice to detect the structure, wherein the step of segmenting is constrained by the region mask by the computer aided diagnosis device.

2. The method of claim 1, further comprising: (f) repeating steps (a) to (e) for every slice in the 3D CT knee image.

3. The method of claim 2, further comprising: outputting the results of step (f) in a 2D stack.

4. The method of claim 2, further comprising: outputting the results of step (f) in a 3D surface.

5. The method of claim 1, wherein the step of (a) creating an intensity prior mask comprises:
   estimating a probability distribution of an intensity of the 2D slice;
   detecting four extrema in the probability distribution; and
   labeling the four extrema.

6. The method of claim 5, wherein the step of estimating a probability distribution comprises: computing a histogram of the intensity of the 2D slice.

7. The method of claim 5, wherein the step of labeling the four extrema comprises:
   labeling a first extrema for a black background;
   labeling a second extrema for dark gray matter;
   labeling a third extrema for light gray matter; and
   labeling a fourth extrema for white matter.

8. The method of claim 1, wherein the step of (c) creating a geometric prior mask comprises:
   raster scanning pixels from the seed point out towards each background boundary;
   detecting two of the scanned pixels that hits the background based on the intensity prior mask;
   determining a diameter of the geometric prior mask from a width of the two detected scanned pixels; and
   creating the geometric prior mask with the diameter.

9. The method of claim 1, wherein the step of (e) segmenting by a level-set contour from the 2D slice, comprises:
   forming an initial 2D contour around the seed point, wherein the contour is represented in terms of a level-set function;
   propagating a level-set contour based on the initial 2D contour, the level-set contour being propagated with a region-based speed that assumes that the Hoffa's pad is a piecewise-constant region; and
   constraining the propagation of the level-set contour by the region mask;
   wherein the step of propagating continues until convergence.

10. The method of claim 1, wherein the step of (b) receiving or estimating a seed point in the 2D slice, comprises: receiving the seed point from a user interface for selecting the seed point.

11. The method of claim 1, wherein the step of (b) receiving or estimating a seed point in the 2D slice, comprises: automatically estimating the seed point utilizing the created intensity mask and relative positions of bone regions with respect to fat regions in the anterior region of the CT knee image.

12. A program storage device readable by a machine, tangibly embodying a program of instructions executable by the machine to perform a method of detecting a structure in a three-dimensional (3D) computed tomography ("CT") knee image, the method comprising:
   creating an intensity prior mask based on a two-dimensional (2D) slice of the CT image;
   estimating a seed point in the 2D slice, the seed point being in a Hoffa's pad region;
   creating a geometric prior mask based on the seed point;
   combining the intensity prior mask and the geometric prior mask to form a region mask; and
   segmenting a level-set contour from the 2D slice to detect the structure, wherein the step of segmenting is constrained by the region mask.

13. The program storage device of claim 12, wherein the estimating a seed point comprises:
   determining a major axis direction by taking a difference between a position vector of the centroid of a bone region of the intensity mask and a position vector of the centroid of a non-black foreground region of the intensity mask; and
   searching along the major axis direction for a seed point in a Hoffa's pad region of the intensity mask.

* * * * *

UNITED STATES PATENT AND TRADEMARK OFFICE
CERTIFICATE OF CORRECTION

| | |
|---|---|
| PATENT NO. | : 7,620,226 B2 |
| APPLICATION NO. | : 11/258422 |
| DATED | : November 17, 2009 |
| INVENTOR(S) | : Unal et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Twenty-sixth Day of October, 2010

David J. Kappos
*Director of the United States Patent and Trademark Office*